No. 12,181.
REISSUED DEC. 8, 1903.
W. B. SMITH.
DOOR HANGER.
APPLICATION FILED JUNE 26, 1903.
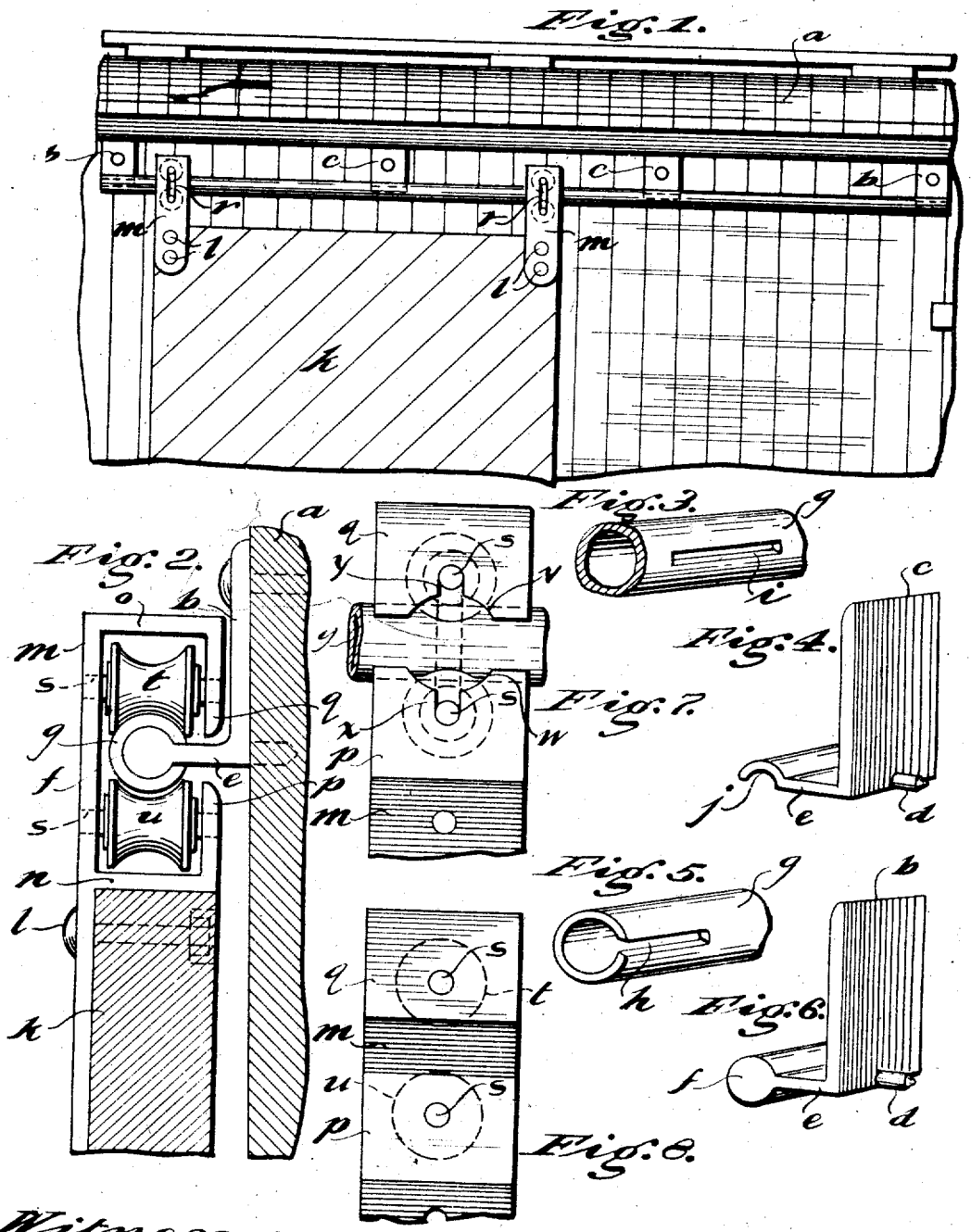
Witnesses:
Rudolf Rummler
Glen C. Stephens
Inventor,
William B. Smith
By Rummler & Rummler
his Attorneys.

No. 12,181. Reissued December 8, 1903.

UNITED STATES PATENT OFFICE.

WILLIAM B. SMITH, OF WARRENSBURG, MISSOURI, ASSIGNOR OF ONE-HALF TO JULIUS STERN, TRUSTEE, OF CHICAGO, ILLINOIS.

DOOR-HANGER.

SPECIFICATION forming part of Reissued Letters Patent No. 12,181, dated December 8, 1903.

Original No. 686,774, dated November 19, 1901. Application for reissue filed June 26, 1903. Serial No. 163,198.

*To all whom it may concern:*

Be it known that I, WILLIAM B. SMITH, a citizen of the United States, residing at Warrensburg, in the county of Johnson and State of Missouri, have invented certain new and useful Improvements in Door-Hangers, of which the following is a specification.

My invention relates to hangers for sliding doors for freight-cars, barns, and other structures, and is an improvement upon the door-hanger shown and described in my Letters Patent No. 665,036, for which application was filed November 27, 1899, Serial No. 738,389.

The main objects of my invention are to provide an improved form of track and supports therefor together with suitable hangers running thereon; to provide a form of such track which can be made strong, efficient, and comparatively light at a comparatively small expense, and which may be conveniently fitted, cut, and secured for any desired lengths; to provide for readily securing such track by any desired number of supports along a given length of the track without interfering with the action of the hangers, and to provide an improved hanger of such form as to permit the ready assembling of the wheel and hanger without machine-work or riveting and to avoid derailment or lateral displacement of such wheel and hanger when same are mounted on the track.

In the drawings, Figure 1 is a side view of a railway-car to which is attached a sliding door by means of the devices embodying the features of my invention. Fig. 2 is a vertical sectional view in detail, showing an edge view of a hanger, a portion of the door, the track, track-support, and the manner in which the latter is attached to the car. Fig. 3 is a detail view in perspective of an intermediate portion of the track. Fig. 4 is a perspective view of one of the intermediate track-supports. Fig. 5 is a perspective view in detail of one end of the track. Fig. 6 is a perspective view in detail of one of the end supports for the track. Fig. 7 is an inside or back view of one of my improved hangers, and Fig. 8 is a like view of a modified form of hanger.

Referring to the drawings, *a* represents the body of an ordinary freight-car, to which are attached by means of bolts or screws end brackets *b b* and intermediate brackets *c c*. The brackets are formed from cast metal and each is provided with a flat plate, as shown, having a stud, Figs. 5 and 6, adapted to be inserted within a bore in the side of the car. An opening (not shown in Figs. 4 and 6) is also provided in the brackets *b* and *c* for the insertion of a bolt, as indicated in Figs. 1 and 2. The brackets are each provided with a horizontal arm *e*. Upon the outer end of the bracket *b* is formed a cylindrical portion *f* of a diameter corresponding to the inner diameter of the tubular track *g*. In each end of said tubular track is formed a slot *h*, Figs. 2 and 5, which is adapted to receive the part *e* of the end bracket, the two end brackets being inserted from opposite directions. Intermediate between the ends at predetermined distances from each other, according to the length of the track, are formed slots *i*, Fig. 3, for engagement with the intermediate brackets *c*, each of which latter is provided with a bent portion *j*, the curve of which conforms to the interior curve of the tube.

It is obvious that when the brackets are inserted within the slots of the tubular track, as described, and in turn secured to the side of the car or other structure the track will be firmly and rigidly supported thereby.

Rigidly atached to the top of the door *k* by means of bolts *l* are hangers, each of which consists of a flat cast-metal plate *m*, having bores therein for the reception of said bolts and extended upwardly above the top of the door. Flanges *n o* are formed upon the plate *m* at right angles thereto and integral therewith, upon the inner ends of which are formed upward and downward vertical extensions *p q*, respectively, which are parallel with the main plate *m*, the inner faces thereof being flush with the inner face of the door. Within the outer plate *m* is formed a vertical slot *r* (shown in Fig. 1 and indicated in dotted lines in Fig. 7) for the reception of the axles *s s* of wheels or rollers *t u*, one of which is placed above and the other below the track, as shown. The axles *s*, which are preferably made from wrought iron or steel, are cast within the wheels, both of which latter are peripherally grooved, as shown, to conform to the cylindrical track, thereby forming flanges upon said wheels, the distance between which, measuring between the upper and lower wheels, is less than the diameter of the track.

Between the ends of the extensions *p q* is formed a space or opening, as shown in Figs. 2, 7, and 8, to receive the arm of the brackets, and thereby enable the hanger to pass the latter without contact. Said extensions are preferably notched or cut away, as shown at *v w*, respectively, to permit the wheels *t u* to be inserted in place within the hangers. Notches *x y* are also formed in said extensions to serve as bearings for the axles *s*.

The lower rollers *u* are placed at a sufficient distance below the track to leave a free space between the two and serve a double purpose—viz., to prevent friction and binding upon the track when the door is pushed from the bottom or when the car-body sags, as well as to secure it at all times to the track, the flanges of the wheels preventing lateral movement.

In utilizing my improved device I first secure the track in position as shown in Fig. 1, after which the wheels are placed in their respective bearings in the hangers, the upper ones being temporarily held in place by hand until the hanger is mounted upon the track. This may be done either before or after the door is bolted to the hangers.

It will be seen from the foregoing that the door is free to roll from end to end of the track without obstruction, none of the brackets forming any impediment thereto. This is an important advantage and permits the track to be shortened several inches, inasmuch as no allowance need be made for the width of either the brackets or hangers, as is usually necessary to do with other forms of tracks and hangers. The tubular form of the track *g*, with its narrow longitudinal slots in the rear, forms a light and strong structure which is not liable to buckle and which can be conveniently attached and supported by hangers such as shown.

Any suitable stop—as *z*, for example—may be formed upon the side of the car to prevent the door from rolling off the end of the track.

It is obvious that the rollers *t u* may be centrally bored and that the axles may be inserted loosely therein and through suitable bores in the hanger-plates, in which case the cut-away portions *v w* may be dispensed with, as shown in Fig. 8; but I prefer the construction first described, in that it permits the more ready assembling of the parts.

Having thus described my invention, what I claim, and desire to secure by Letters Patent, is—

1. In a device of the class described, the combination of a hollow track open in the rear for the reception of supporting-brackets, of supporting-brackets having their ends formed to fit the inner contour of said hollow track, hangers located at or near the respective upper corners of the door to be suspended thereby, each of said hangers having flanged wheels mounted therein, one above and the other below said track, said hangers being each provided with an opening in the rear thereof to permit the same to pass the arms of said supporting-brackets, substantially as described.

2. In a device of the class described, the combination with a track and means for supporting same from the rear, of hangers having grooved wheels mounted therein above and below said tracks respectively, each of said hangers having the upward and downward extensions *p q* in the rear thereof to form end bearings for the support of the inner ends of the wheel-axles, substantially as described.

3. In a device of the class described, the combination with a hollow cylindrical track having longitudinal slots formed therein at and from the respective ends, intermediate longitudinal slots at predetermined distances between said ends, supporting end brackets fitted to engage said end slots and to fill the tubular opening in the track, intermediate brackets for engaging said intermediate slots, and hangers having grooved wheels mounted therein above and below the track and an opening in the rear thereof to permit said hangers to pass said brackets, the height of said openings being less than the diameter of the track, substantially as shown and described.

4. A device of the class described, comprising a substantially cylindrical hollow track slotted in the rear; supporting-brackets extending through the slotted part with ends formed to contact with the inner surface of the hollow track so as to rigidly sustain the same; and a hanger adapted to pass said brackets and having a flanged wheel running upon the track, substantially as described.

5. A device of the class described, comprising a substantially cylindrical hollow track slotted in the rear; supporting-brackets extending through the slotted part with ends formed to contact with the inner surface of the hollow track so as to rigidly sustain the same; and a hanger running upon the track and adapted to pass said brackets, substantially as described.

6. A device of the class described, comprising a substantially cylindrical hollow track slotted in the rear; an intermediate supporting-bracket extending through the slotted part with end formed to contact with the inner surface of the hollow track so as to rigidly sustain the same; end brackets adapted to support the track and to prevent its longitudinal movement on the intermediate bracket; and a hanger running upon the track and adapted to pass said intermediate bracket; said end brackets having the track-supporting part extending into the track to a point below and inward of the part traversed by the hanger, substantially as described.

7. A device of the class described, comprising a substantially cylindrical hollow track slotted in the rear; an intermediate supporting-bracket extending through the slotted part with end formed to contact with the inner surface of the hollow track so as to rigidly sustain the same; end brackets adapted to support the track and to prevent its longitudinal movement on the intermediate bracket; and a hanger running upon the track and adapted to pass said intermediate bracket, substantially as described.

In testimony whereof I have signed this specification, in the presence of two subscribing witnesses, this 27th day of May, 1903.

WILLIAM B. SMITH.

Witnesses:

P. H. EARLY,

WM. R. RUMMLER.